Aug. 6, 1963
M. C. JONES, JR
3,100,038
GROUPING AND LOADING APPARATUS FOR BAKERY
EQUIPMENT AND THE LIKE
Filed Sept. 29, 1960
3 Sheets-Sheet 1
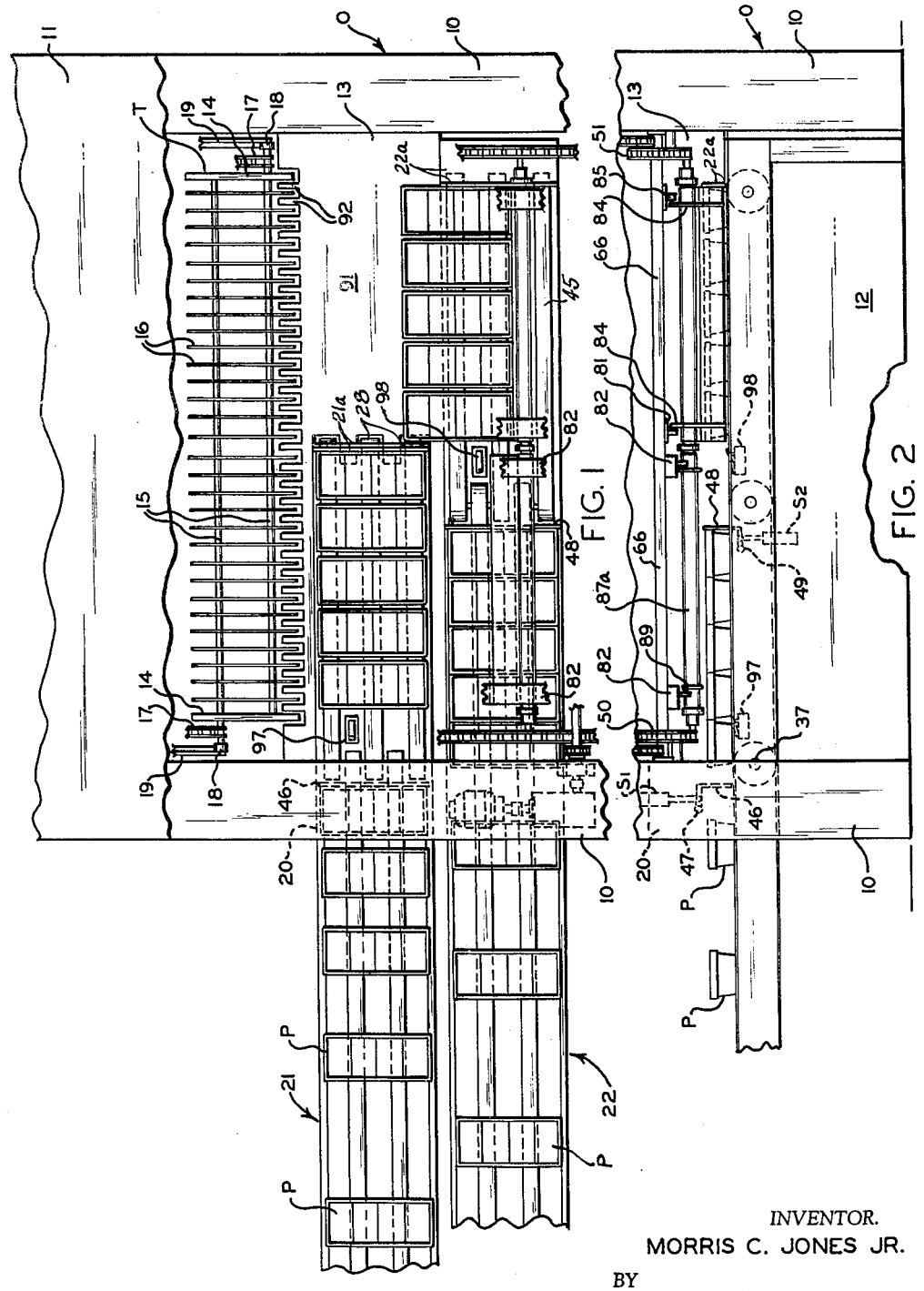
INVENTOR.
MORRIS C. JONES JR.
BY
ATTORNEYS Aug. 6, 1963    M. C. JONES, JR    3,100,038
GROUPING AND LOADING APPARATUS FOR BAKERY
EQUIPMENT AND THE LIKE
Filed Sept. 29, 1960    3 Sheets-Sheet 2

INVENTOR.
MORRIS C. JONES JR.
BY
ATTORNEYS

INVENTOR.
MORRIS C. JONES JR.

United States Patent Office 3,100,038
Patented Aug. 6, 1963

3,100,038
GROUPING AND LOADING APPARATUS FOR BAKERY EQUIPMENT AND THE LIKE
Morris C. Jones, Jr., Saginaw, Mich., assignor to Baker Perkins Inc., Saginaw, Mich., a corporation of New York
Filed Sept. 29, 1960, Ser. No. 59,219
11 Claims. (Cl. 198—30)

This invention relates to grouping and loading apparatus and particularly to novel and useful apparatus of this character designed to render it capable of more rapidly loading units such as baking ovens so that buns (as well as bread) can be processed at the increased rate of travel which is necessary for buns.

It is a primary object of the instant invention to provide grouping and loading apparatus for baking ovens and the like which can furnish the required number of pans of "fast bake" products such as buns without requiring the product supply conveyors or loaders to be speeded up beyond rates of travel which are considered desirable.

A further object of the invention is to provide grouping and loading apparatus of the character described including side-by-side conveyor lines having grouping and loading conveyors, and pusher bars which load directly from the conveyor lines.

A further object of the invention is to provide bread pan handling apparatus of the character described which is also well suited to the loading of such products as bun trays to a continuously operating tray oven conveyor traveling at top speed.

Briefly, the invention is concerned with a pair of side-by-side conveyor lines of different length which extend alongside the mouth of the oven, and a generally reciprocable pusher mechanism including a pusher member which is disposed in an inoperative position at the commencement of the loading stroke and passes over one of the conveyor lines before it lowers to move grouped pans from the other conveyor line to a portion of the length of the tray, while a second loader pusher member simultaneously sweeps across the first mentioned conveyor line to load pans to the remaining surface of the tray.

Other objects and advantages of the invention will be pointed out specifically or will become apparent from the following description when it is considered in conjunction with the appended claims and the accompanying drawings, in which:

FIGURE 1 is a top plan view showing a pair of side-by-side conveyor lines extending past the mouth of an oven and illustrating portions of the loader apparatus in a rear position at substantially the commencement of a loading stroke;

FIGURE 2 is a fragmentary, side elevational view thereof;

Figure 3:
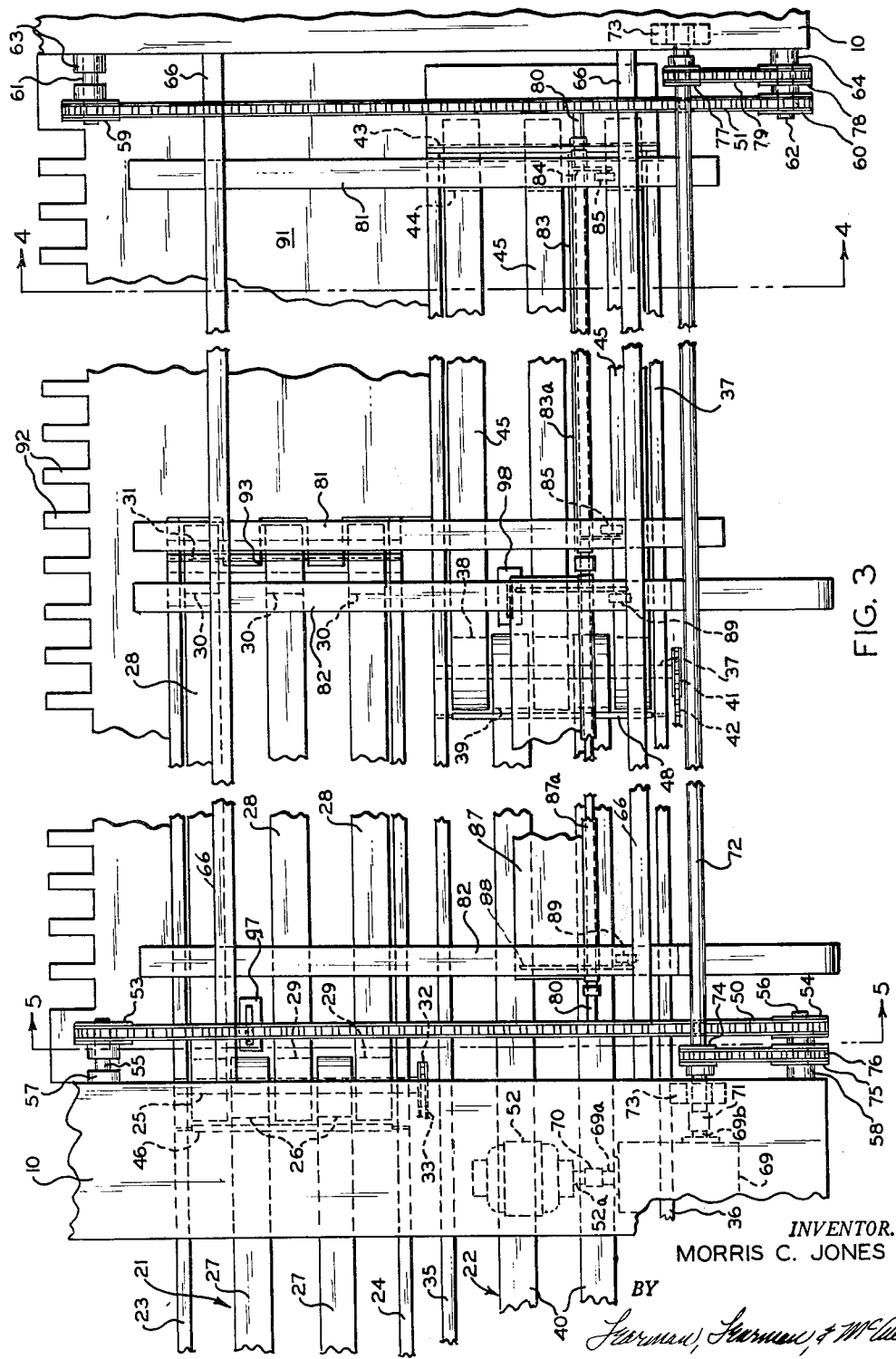
FIGURE 3 is an enlarged, top plan view more particularly illustrating the various elements of the invention.
Figure 4:
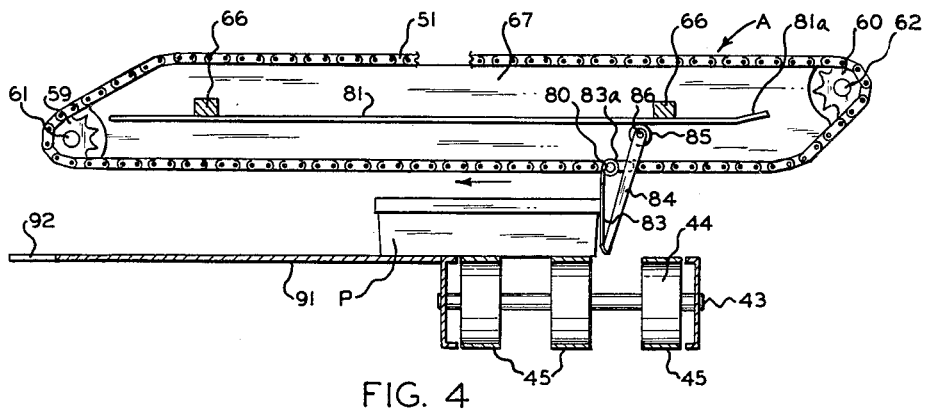
FIGURE 4 is a transverse, sectional view taken on the line 4—4 of FIGURE 3 to illustrate the operation of one of the loader members.
Figure 5:
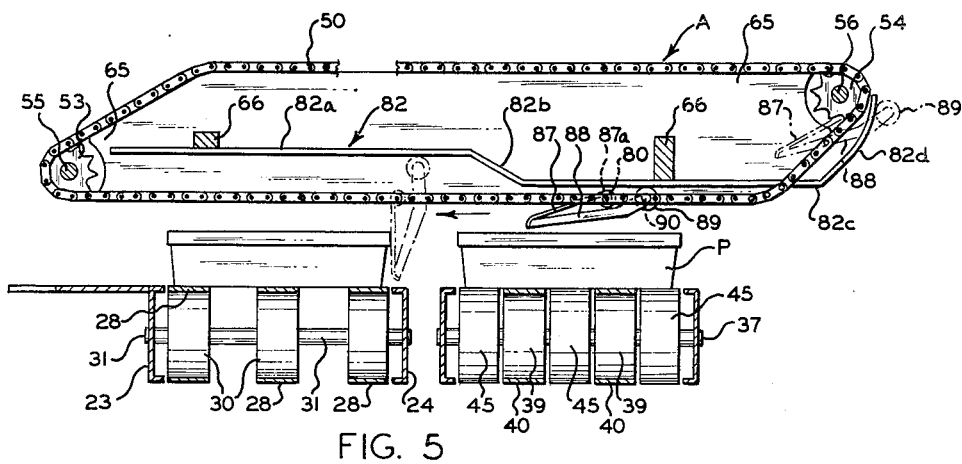
Figure 6:
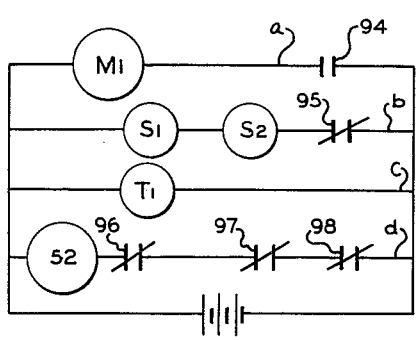

FIGURE 5 is a transverse, sectional view taken on the line 5—5 of FIGURE 3 to illustrate the operation of the other loader member, the diagrammatic lines illustrating various positions thereof and the loader member of FIGURE 4 and the pans it is pushing being omitted in the interests of clarity; and FIGURE 6 is a schematic view illustrating an electrical control system which could be employed to control the operation of the various operative elements.

Referring now more particularly to the accompanying drawings, wherein I have shown a preferred embodiment of the invention, a letter O (FIGURES 1 and 2) generally indicates the insulated housing of a conventional baking oven which has side wall casings 10, a top wall 11, and a front wall portion 12 of reduced height defining, with the side walls 10, an oven mouth 13. Mounted in the oven O is the usual endless tray conveyor including a tray generally indicated by the letter T which is, as usual, constructed of end plates 14 connected by support shafts 15 to which the grid rods 16 are welded.

The oven conveyor drive chains 17 are connected to the extended ends of the shafts 15, as shown, to move the tray T in its path to the rear of the oven and back to the front once again, and the shafts 15 mount rollers 18 in the usual manner which travel on tracks 19 provided at the mouth of the oven, as shown. It is to be understood that the oven described is only typical of a unit which can be loaded by the apparatus to be more particularly described and other units such as proofers and coolers could have been as easily depicted. Patents Nos. 2,885,973 and 2,888,126 show typical variable speed oven tray conveyor circuits of this type in greater detail.

Extending into the front of the mouth portion 13 of the oven interior through an opening 20 provided through the one side wall 10 are a pair of side-by-side conveyor lines generally designated 21 and 22 which lead from proofers or other units in the bakery production line and carry pans P of proofed dough to the oven. As shown more particularly in FIGURE 3, the conveyor line 21 includes a pair of transversely spaced apart, longitudinally extending side frame members 23 and 24 which journal a shaft 25 having a pair of spaced roller members 26 fixed thereon. Trained over the rollers 26 are supply conveyor belts or plate conveyor elements 27 which are supported at their opposite ends by similar roller members (not shown). The conveyor line 21 also includes a trio of spaced apart, endless belt or plate conveyor members 28 extending longitudinally beyond the conveyors 27 in transversely intersecting relationship therewith. Rear roller members 29 fixed on the shaft 25 and front roller members 30 mounted on a similar shaft 31 journaled by the side members 23 and 24 support the conveyors 28. The extending end of shaft 25 may mount a sprocket 32 over which an endless drive chain 33, connecting with suitable motor, can be trained to drive the conveyors 27 and 28 at the desired rate of speed.

The conveyor line generally designated 22 similarly includes side frame members 35 and 36 supporting a shaft 37 on which rollers 38 and 39 are journaled. Endless plate or belt conveyors 40 delivering pans from the proofer or other unit are trained around the rollers 39 and similar rollers at the rear ends of conveyors 40, and a sprocket 41 may be mounted on the extending end of shaft 37 to drive the rollers 38 and 39 through the medium of an endless chain 42 which is connected with a suitable motor. The frame members 35 and 36 also mount a front shaft 43 which has roller members 44 opposite the rollers 38 and endless belt or plate conveyors 45 are trained around the rollers 38 and 44.

As seen in FIGURE 1, the pans P travel on the conveyor lines 21 and 22 from the proofer in randomly spaced relationship and the instant invention contemplates a grouping procedure so that ten pans can be transferred to the oven tray T at a time. An upwardly swingable, angular stop 46 may be pivoted at 47 to the side wall 10 and connected with the reciprocable operating rod of a conventional solenoid or electrically operated, double acting air cylinder S-1. Stop 46 is shown in "down" position in FIGURES 1 and 2. The pans on conveyor line 21 are grouped in fives, prior to being passed to the portion of conveyor line 21 opposite the oven tray T.

Similarly, the pans P on conveyor line 22 may be arranged in groups of five by a downwardly swingable, angular stop member 48 which is pivotally supported at 49 from the oven and is actuated by the reciprocable operating rod of a conventional solenoid or electrically operated, double acting air cylinder S–2. In FIGURE 1, the pans on the conveyor lines 21 and 22 are in a position to be loaded on the tray T and pusher apparatus generally designated A is shown for moving the pans P forwardly. The pusher apparatus A includes a pusher member which passes over the group of five pans immediately to the left of the leading group of five pans on conveyor line 22 and then lowers to engage the leading group of five pans on conveyor line 21, as well as a pusher member which pushes the leading group of five pans on conveyor line 22 simultaneously to the tray T. The group of five pans on conveyor line 22 which have been passed over by the pusher apparatus A and the next group of pans on conveyor line 21 will be delivered forwardly along conveyor line 22 during the stroke of the pusher apparatus to replace the pans P transferred. While, in the illustrated embodiment of the invention, groups of five pans are shown being handled so that a total of ten pans will be delivered to the tray T, it is to be understood that any lesser or greater number of pans may be transferred to trays of different length with but minor changes in various elements of the invention. Angle plate 22a connects with members 35 and 36 and functions as a positive stop at the end of conveyor line 22.

The pusher apparatus A includes a pair of endless chain members 50 and 51 (FIGURE 3) which are driven from a common drive system including motor 52. Endless chain 50 (see also FIGURE 5) is trained around inner and outer sprockets 53 and 54 mounted on stub shafts 55 and 56, respectively, which are journaled by bearings 57 and 58, respectively, on the oven side wall casing 10. The endless chain 51 (FIGURES 3 and 4) is trained around sprockets 59 and 60 mounted on stub shafts 61 and 62, respectively, which are journaled by bearings 63 and 64 provided on the other oven side wall casing 10. A stationary guide 65 supported from the side wall casings 10 of the oven by brace members 66 in part determines the path of travel followed by chain 50, and a similar stationary guide 67 supported similarly by the guides 66 in part determines the path of travel of chain 51.

Stub shafts 56 and 62, which are powered to drive the chains 50 and 51, respectively, are driven from the motor 52 through a gear reduction box 69 which has input shaft 69a coupled as at 70 to the armature shaft 52a of the motor 52. The output shaft 69b on the gear reduction box 69 is coupled as at 71 to a jack shaft 72 supported by bearings 73 from the oven side wall casings 10. Provided on the jack shaft 72 is a sprocket 74 which drives a sprocket 75 on the stub shaft 56 through the medium of a chain 76, and mounted on the opposite end of jack shaft 72 is a sprocket 77 which drives a sprocket 78 on stub shaft 62 through the medium of a chain 79.

Spanning the endless chain members 50 and 51 is a shaft 80 which is fixed to a link on each of the chains 50 and 51 and carries the pusher members which will be described. At the right end of the pusher apparatus A in FIGURE 3, a pair of spaced apart, transversely extending track members 81 (see also FIGURE 4) are provided, supported by the braces 66, and it will be seen that the braces 66 also support a pair of spaced apart, transversely extending tracks 82 at the left end of the pusher apparatus A above the conveyor lines 21 and 22. The tracks 82 have upper horizontal portions 82a, inclined portions 82b, lower horizontal portions 82c, and upwardly curved portions 82d.

Mounted on the right end of shaft 80 in FIGURE 3 is a pusher bar 83 (see also FIGURE 4) which has an upper socket portion 83a pivotal on the shaft 80. Arms 84 extend upwardly and angularly from the pusher bar 83 and rotatably mount follower rollers 85 on pins 86 so that the rollers 85 may travel easily on guides 81. The left hand pusher bar 87 (FIGURE 5), which is independent of the pusher bar 83, similarly has a socket portion 87a pivotal on the shaft 80, and arms 88 extending from the bar 87 mount rollers 89 which are rotatably pinned as at 90 to the arms 88, as shown, to permit the rollers 89 to ride easily on the tracks 82.

As shown in FIGURE 4, the pusher bar 83, as it moves down past sprocket 60 on the chain 51, is disposed at a slight angle by the forces of gravity just before it comes into contact with the group of five pans on the conveyors 45. The rollers 85 first engage the inclined portions 81a of the tracks 81 and, because of the slope of portions 81a, the pusher bar 83 initially engages the pans of proofed dough in a gentle manner which does not shock the dough and cause it to deflate. As the rollers 85 continue to guide along the bottom of guide tracks 81, the pans P are pushed from the conveyors 45 to the bridge plate 91 which, as shown in FIGURE 1, has finger support portions 92 between which the rods 16 of the tray pass upwardly. The tracks 81 are of such length that the pans P from conveyors 45 are pushed to a transversely central position on the tray T.

As pusher 83 is moving forwardly, pusher 87 is likewise moving forwardly with guide rollers 89 initially following the portions 82d (FIGURE 5) of the tracks 82, and thence the lower horizontal portions 82c of the tracks 82. With track portions 82c offset downwardly, the pusher plate 87 is folded inwardly to the lower run of the chain 50 and passes over the group of pans P on the conveyors 40. When the rollers 89 reach the portions 82b of guides 82, the pusher plate 87 is gently lowered into engagement with the pans P on conveyors 28 so as not to deflate the dough, and the leading group of five pans on conveyors 28 are moved to the left end of the tray T simultaneously with movement of the group of pans P on conveyors 45 to the tray T.

As the chains 50 and 51 travel upwardly around the sprockets 59 and 53, respectively, the pusher plates 87 and 83 hang freely initially to clear the pans P on the tray T, which is moving upwardly and away from the chains 50 and 51, and thence are pivoted to "up" position by the front ends of the tracks 81 and 82 and move rearwardly in the position they are permitted to assume as they return rearwardly. While the tray T has been described as mounted on a continuously traveling oven conveyor system, it is not necessary that this be the case and, of course, the oven conveyor could be of a type which operates intermittently.

In FIGURE 6 an electrical control system is disclosed as typical of one which may be employed. A conventional timer is shown for the sake of convenience as controlling starting and stopping of the various elements; however, it is to be understood that suitably placed limit switches could also be used at the ends of conveyor lines 21 and 22 mounted on angle stop walls such as 21a and 22a. Also, conveyor lines 21 and 22 could be driven by separate motors so that stop 46 could be lifted and reloading of conveyors 45 initiated just after pusher 83 has cleared the inner conveyor 45, if desired. In the present system, which is intended only as illustrative of a system which could be used, motor M–1, which drives the chains 33 and 42, is shown in a circuit line a, with the normally open contacts 94 of a conventional timer T–1. Solenoids S–1 and S–2 for controlling the operation of gates 46 and 48, respectively, are provided in a circuit line b in series with normally closed timer contacts 95. The timer T–1 is in a circuit line c and motor 52 is in a circuit line d with timer contacts 96.

In operation, it will be assumed that the pans are in position for loading on conveyors 28 and 45, as shown in FIGURES 1, 2, 4, and 5, and at this time, while motor 52 is inoperative, timer contacts 95 are closed and solenoids S–1 and S–2 are energized to dispose solenoids S–1 and S–2 in lowered and raised positions, respectively, to block the pans on conveyor lines 21 and 22. First of all, timer contacts 96 are permitted to close to start motor 52 and when the pusher plates 83 and 87 have moved forwardly to the point where they clear conveyors 28, the timer T–1 closes contacts 94 to start the motor M–1 and simultaneously opens contacts 95 to deenergize solenoids S–1 and S–2 and raise and lower gates or stops 46 and 48, respectively, so that the pans will be free to move forwardly on conveyor lines 21 and 22. When the pusher plates 83 and 87 have returned to rearward position the contacts 96 are opened, and when the pan sets have been moved into position opposite the tray T once again and timer T–1 through contacts 94 deenergizes motor M–1. Solenoids S–1 and S–2 are reenergized by the timer contacts 95 prior to the time that motor M–1 is stopped and gates 46 and 48 thereby group the pans as illustrated particularly in FIGURE 2.

Safety switches 97 and 98, both of which are normally closed, are provided in circuit line d in series with the motor 52 so that the motor is inoperative if a pan rests on either of the switches 97 or 98. In addition, limit switches can be provided at the ends of the conveyor lines 21 and 22 to stop the motor M–1 as noted. However, these are not shown and it will be assumed, for the sake of convenience, that the motor M–1 is stopped by the timer contacts 94.

It will be apparent that I have perfected a very practical grouping and loading system which can be efficiently used in loading products which require faster processing to baking ovens, proofers, coolers, and the like, as well as the products which are most frequently fed to these units for processing at slower speeds.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:
1. Loading apparatus for loading a product to a unit such as a conveying tray in a baking oven comprising; side-by-side, inner and outer longitudinally extending conveyor means leading alongside the unit; pusher means including a first sweep member for one conveyor means and a second sweep member for the other conveyor means longitudinally displaced from said first sweep member; and means for operating said sweep members in unison in a loading stroke toward said unit so that each loads part of the longitudinal length of the tray; said latter means including means for maintaining one of said sweep members in operative withdrawn position while the other is in sweeping position during a portion of the loading stroke to permit it to clear products on the outer conveyor means and permitting its return to operative position during another part of the loading stroke so that it sweeps from only the inner conveyor means.

2. Loading apparatus for loading products to a unit such as a traveling tray in a baking oven comprising; side-by-side, longitudinally extending conveyor means leading past the unit; gate means operative to group the products on said conveyor means; pusher means operating in timed relation with said gate means including a first sweep member for one conveyor means and a second sweep member for the other conveyor means longitudinally displaced from said first sweep member; and means for operating said sweep members in unison so that each loads part of the longitudinal length of the tray; said latter means including cam track means for disabling one of said sweep members during a portion of the loading stroke.

3. Loading apparatus for loading pans or the like to a unit such as the tray of a tray conveyor in a baking oven comprising; side-by-side, inner and outer, longitudinally extending conveyor lines leading alongside the mouth of the unit, the inner conveyor line terminating intermediate the length of the tray and the outer conveyor line extending the full length of the tray; pusher means including a first sweep member for the inner conveyor line extending opposite the one end of the tray and terminating intermediate the length thereof, and a second sweep member for the outer conveyor line longitudinally displaced forwardly from said first sweep member opposite the other end of the tray; and means for operating said sweep members in unison so that each loads part of the longitudinal length of the tray; said latter means including means for holding said first sweep member in raised, inoperative position to pass over the outer conveyor line without sweeping pans therefrom during the initial portion of the loading stroke and thence lowering said first sweep member so that it engages and loads pans from said inner conveyor line.

4. Pusher apparatus for loading a line of products to a surface such as a traveling baking oven tray comprising side-by-side conveyor lines extending longitudinally parallel to the surface; at least one conveyor line extending the length of the surface; first and second pusher members having a path of travel transversely to the conveyor lines from a rear position outward of the conveyor lines and opposite said surface across both conveyor lines to the said surface; stop means for stopping the products on the other conveyor line opposite only a portion of the length of the surface; means for disposing one of said pusher members out of operative position during its travel across said one conveyor line and restoring it to operative position so that it travels operatively across the adjacent conveyor line; and means for operating said stop means in timed relation with said pushers.

5. Loading apparatus for loading pans or the like including a support surface to which the pans are to be loaded comprising; side-by-side, inner and outer, longitudinally extending conveyor lines leading alongside the support surface; the inner conveyor line terminating intermediate the length of the support surface and the outer conveyor line extending the full length of the support surface; pusher means including a first sweep member for the inner conveyor line extending opposite one portion of the length of the support surface and terminating intermediate the length thereof, and a second sweep member for the outer conveyor line longitudinally displaced forwardly from said first sweep member opposite the other portion of the support surface; and means for operating said sweep members in unison so that each loads part of the longitudinal length of the support surface; said latter means including means for holding said first sweep member in raised, inoperative position to pass over the outer conveyor line without sweeping pans therefrom during the initial portion of the loading stroke and thence lowering said first sweep member so that it engages and loads pans from said inner conveyor line.

6. Loading apparatus in combination with a support surface such as a tray conveyor in a baking oven comprising; side-by-side, inner and outer, longitudinal extending conveyor lines leading alongside the mouth of the unit; the inner conveyor line terminating intermediate the length of the tray and the outer conveyor line extending the full length of the tray; each conveyor line including a first supply conveyor and a second conveyor longitudinally forward thereof; the inner first supply conveyor and second conveyor terminating and commencing respectively at the rear end of the support surface and the outer first supply conveyor and second conveyor terminating and commencing respectively intermediate the length of the support surface; a displaceable gate between the first and second conveyors of each line; pusher means including a first sweep member for the inner conveyor line extending opposite the one end of the tray and terminating intermediate the length thereof, and a second sweep member for the outer conveyor line longitudinally displaced forwardly from said first sweep member opposite the other end of the tray; means for operating said sweep members in unison so that each loads part of the longitudinal length of the tray; said latter means including means for holding said first sweep member in raised, inoperative position to pass over the outer conveyor line without sweeping pans therefrom during the initial portion of the loading stroke and thence lowering said first sweep member so that it engages and loads pans from said inner conveyor line; and means for maintaining said gates in position to block pans on said first conveyors during at least a portion of the loading stroke of said sweep members and thence raising them afterwards to permit the pans transferred to said support surface to be replaced by grouped pans from said first conveyors.

7. Loading apparatus for loading pans or the like to a unit such as a baking oven comprising; a support surface in the unit; side-by-side, inner and outer, longitudinally extending conveyor lines leading alongside the support surface; the inner conveyor line terminating intermediate the length of the support surface and the outer conveyor line extending the full length of the support surface; pusher means including a first sweep member for the inner conveyor line extending opposite the near end portion of the length of the support surface and terminating intermediate the length thereof, and a second sweep member for the outer conveyor line longitudinally displaced forwardly from said first sweep member opposite the remaining length of the support surface; longitudinally spaced, transversely disposed endless members at the ends of said support; a shaft connecting said endless members; means pivotally mounting said sweep members on said shaft; means for operating said endless members and sweep members in unison so that each loads part of the longitudinal length of the tray; transversely extending guide tracks supported above said conveyor lines for each sweep member; a follower arm on each sweep member engaging one of said tracks; said track for said first sweep member including a downwardly offset portion for holding said first sweep member in raised, inoperative position to pass over the outer conveyor line without sweeping pans therefrom during the initial portion of the loading stroke and a portion raised therefrom to permit said first sweep member to lower when it reaches said inner conveyor line so that it engages and loads pans from said inner conveyor line to the said near end portion of the support surface while the second sweep member loads pans from the outer conveyor line to the said remaining portion of the support surface.

8. The combination defined in claim 7 in which said portions of the track for the first sweep member are connected by an inclined portion.

9. The combination defined in claim 7 in which said tracks have upwardly curved outer end portions.

10. The combination defined in claim 7 in which comcon longitudinally extending brace members support said tracks.

11. Loading apparatus including a support surface in a baking oven or the like comprising; side-by-side, inner and outer conveyors leading parallel to the surface and adjacent the surface; and cam track means, including a transfer member moving to an operative position at the outer edge of the inner conveyor from an inoperative position and a transfer member moving from an inoperative position to an operative position at the outer edge of the outer conveyor, for moving products from each of the conveyors to a different portion of the length of the support surface.

References Cited in the file of this patent

UNITED STATES PATENTS

| 1,764,153 | Cramer | June 17, 1930 |
| 1,967,366 | McGovern | July 24, 1934 |
| 2,047,272 | Kimball | July 14, 1936 |
| 3,027,990 | Blank | Apr. 3, 1962 |

FOREIGN PATENTS

| 485,449 | Great Britain | May 19, 1938 |